Patented July 5, 1949

2,475,081

UNITED STATES PATENT OFFICE 2,475,081

BIGUANIDE DERIVATIVES

Francis Henry Swinden Curd, Dora Nellie Richardson, and Francis Leslie Rose, Blackley, Manchester, England, assignors to Imperial Chemical Industries Limited, a corporation of Great Britain No Drawing. Application June 19, 1947, Serial No. 755,712. In Great Britain October 8, 1945

12 Claims. (Cl. 260—565)

This invention relates to new compounds and more particularly it relates to compounds which are useful as antimalarial agents. The present application is a continuation-in-part of co-pending application No. 713,822, now abandoned.

An object of the present invention is to provide new compounds having chemotherapeutic properties and being useful in the treatment of malaria. Another object is to provide a process for making the said compounds. Other and further important objects of this invention will appear as the description proceeds.

These objects are attained by the present invention according to which there are provided new biguanide derivatives of the general formula:

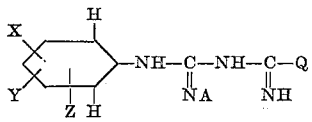

wherein X and Y represent atoms or radicals selected from the group of hydrogen, halogen and alkyl radicals of 1–3 carbon atoms, Z represents an atom selected from the group consisting of chlorine, bromine and iodine, A represents an alkyl radical of 1–3 carbon atoms and Q represents the radical of a nitrogenous base selected from the group consisting of monoalkylamines and dialkylamines, Q having altogether more than 1 and fewer than 8 carbon atoms.

The new biguanides are made by a process which comprises interaction of an aryldicyandiamide of the formula:

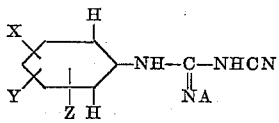

and an amine of the formula QH, wherein X, Y, Z, A and Q have the significance stated above. The reaction may conveniently be brought about by heating the reagents together, if desired in presence of a solvent or diluent which for convenience may be an excess of nitrogenous base QH when this is liquid under the conditions of reaction employed, or it may be nitrobenzene or dioxan.

The nitrogenous compound QH may be used either in the form of the free base or in the form of a salt for example the hydrochloride. Further the reaction may advantageously be carried out in the presence of a metal such as zinc or copper which may be used as such or in the form of an oxide, hydroxide or salt or as a pre-formed addition compound with the amine. There may be used for instance copper powder, hydrated copper oxide, copper sulphate or zinc chloride. In such cases the presence of the metal increases the speed of the reaction and improves the yield of biguanide. Also the biguanide can frequently be conveniently isolated directly from the reaction mixture in the form of a sparingly soluble complex with the metal salt.

The aryl dicyandiamides required as one of the starting materials are conveniently made by interaction of a $N^1$-aryl-$N^2$-cyano-S-alkyl-isothiourea with a primary aliphatic amine as described in co-pending application Serial No. 713,821.

The novel compounds of this invention are all characterized by a common structure, as expressed by the above general formula, and by substantially common physical and chemical characteristics. Outstanding among their properties is the pharmaceutical property of being excellent antimalarial agents. Our novel compounds thus constitute synthetic substitutes for quinine. While the degree of efficacy as an antimalarial agent will, of course, very from one individual compound to the next, we have tested so large a number of members of the general class against avian malaria that it may safely be postulated that all the compounds of the class have antimalarial properties.

Among the numerous compounds already tested against *Plasmodium gallinaceum* infection of chicks the following substances have been found to be active against both erythrocytic and exo-erythrocytic forms of the parasite:

$N^1$ - p-iodophenyl - $N^2$ - ethyl-$N^5$-isopropylbiguanide $N^1$ - p-iodophenyl-$N^2$-methyl-$N^5$-isopropylbiguanide $N^1$ - p - bromophenyl-$N^2$-ethyl-$N^5$-isopropylbiguanide $N^1$ - p - bromophenyl-$N^2$-methyl-$N^5$-isopropylbiguanide $N^1$ - p - chlorophenyl-$N^2$-methyl-$N^5$-n-butylbiguanide $N^1$ - p - chlorophenyl-$N^2$-ethyl-$N^5$-n-butylbiguanide $N^1$ - p - chlorophenyl-$N^2$-ethyl-$N^5$-benzylbiguanide $N^1$ - p-chlorophenyl-$N^2$-ethyl-$N^5$-n-propylbiguanide $N^1$ - p - chlorophenyl-$N^2$-methyl-$N^5$-n-propylbiguanide $N^1$-p-chlorophenyl-$N^2$:$N^5$-diethylbiguanide $N^1$ - p-chlorophenyl-$N^2$:-$N^5$-diisopropylbiguanide
$N^1$ - p-chlorophenyl-$N^2$-ethyl-$N^5$-isopropylbiguanide
$N^1$ - p - chlorophenyl-$N^2$-methyl-$N^5$-isopropylbiguanide
$N^1$ - p - chlorophenyl - $N^2$:$N^5$-dimethyl-$N^5$-isopropylbiguanide
$N^1$ - p-chlorophenyl-$N^2$-ethyl-$N^5$-methyl-$N^5$-isopropylbiguanide.

Other specific compounds of this invention include:

$N^1$ - 3:4-dichlorophenyl-$N^2$-methyl-$N^5$-isopropylbiguanide
$N^1$-3:4 - dichlorophenyl - $N^2$-ethyl-$N^5$-isopropyl biguanide
$N^1$ - 3:4 - dichlorophenyl-$N^2$:$N^5$-isopropylbiguanide
$N^1$-3:4 - dichlorophenyl-$N^2$-methyl-$N^5$-n-butyl-biguanide
$N^1$-3:4 - dichlorophenyl-$N^2$-methyl-$N^5$-n-propyl-guanide
$N^1$-3:4 - dichloroprophenyl-$N^2$-methyl-$N^5$-ethyl-biguanide
$N^1$-3:4 - dichlorophenyl-$N^2$:$N^5$-dimethyl-$N^5$-isopropylbiguanide
$N^1$-3:4 - dichlorophenyl-$N^2$-ethyl-$N^5$-methyl-$N^5$-isopropylbiguanide
$N^1$ - 3-chloro-4-bromophenyl-$N^2$-methyl-$N^5$-isopropylbiguanide
$N^1$ - 3 - chloro-4-bromophenyl-$N^2$-ethyl-$N^5$-isopropylbiguanide
$N^1$ - 3 - chloro-4-iodophenyl-$N^2$-methyl-$N^5$-isopropylbiguanide
$N^1$ - 3 - chloro - 4 - iodophenyl-$N^2$-ethyl-$N^5$-isopropylbiguanide
$N^1$ - 3-bromo-4-chlorophenyl-$N^2$-methyl-$N^5$-isopropylbiguanide
$N^1$ - 3 - bromo-4-chlorophenyl-$N^2$-ethyl-$N^5$-isopropylbiguanide
$N^1$ - 3:4-dibromophenyl-$N^2$-methyl-$N^5$-isopropylbiguanide
$N^1$ - 3:4-dibromophenyl-$N^2$-ethyl-$N^5$-isopropylbiguanide
$N^1$ - 3 - bromo-4-iodophenyl-$N^2$-methyl-$N^5$-isopropylbiguanide
$N^1$ - 3 - bromo - 4 - iodophenyl-$N^2$-ethyl-$N^5$-isopropyl biguanide
$N^1$ - 3 - iodo-4-chlorophenyl-$N^2$-methyl-$N^5$-isopropylbiguanide
$N^1$ - 3 - iodo - 4 - chlorophenyl-$N^2$-ethyl-$N^5$-isopropylbiguanide
$N^1$ - 3 - iodo-4-bromophenyl-$N^2$-methyl-$N^5$-isopropylbiguanide
$N^1$ - 3 - iodo - 4 - bromophenyl-$N^2$-ethyl-$N^5$-isopropylbiguanide
$N^1$ - 3:4 - diiodophenyl-$N^2$-ethyl-$N^5$-isopropylbiguanide
$N^1$ - 3:4 - diiodophenyl - $N^2$-ethyl-$N^5$-isopropylbiguanide
$N^1$ - 3 - chlorophenyl - $N^2$-methyl-$N^5$-isopropylbiguanide
$N^1$ - 3 - bromophenyl-$N^2$-ethyl-$N^5$-isopropylbiguanide
$N^1$ - 3 - iodophenyl-$N^2$-methyl-$N^5$-isopropylbiguanide
$N^1$ - 3 - iodophenyl - $N^2$ - ethyl-$N^5$-isopropylbiguanide
$N^1$ - 3 - chloro-4-methylphenyl-$N^2$-methyl-$N^5$-isopropylbiguanide
$N^1$ - 3 - bromo-4-methylphenyl-$N^2$-methyl-$N^5$-isopropylbiguanide
$N^1$ - 3 - iodo-4-methylphenyl-$N^2$-methyl-$N^5$-isopropylbiguanide
$N^1$ - 4 - chloro-3-methylphenyl-$N^2$-ethyl-$N^5$-isopropylbiguanide
$N^1$ - 4 - bromo-3-methylphenyl-$N^2$-ethyl-$N^5$-isopropylbiguanide
$N^1$ - 4 - iodo-3-methylphenyl-$N^2$-ethyl-$N^5$-isopropylbiguanide All these substances may be made by the method hereinbefore set forth.

The new compounds are strong bases; they form stable salts with organic and inorganic acids which in many cases are freely soluble in water. The salts may be made by treating the biguanides in water with the appropriate acid and then removing the water, but they are more conveniently obtained in a dry form by mixing the components together in an organic solvent such as for example acetone, or an alcohol, in which the salt is sparingly soluble. For use chemotherapeutically it is frequently an advantage to apply the new compounds in the form of their salts, especially those salts which are water-soluble. For this purpose there may be used for example the acetates, propionates, butyrates, crotonates, formates, malonates, succinates, glycollates, tartrates, citrates, hydrochlorides, nitrates, sulphates, lactates, methanesulphonates, methylenedisalicylates or the methylene-bis-$\beta$-hydroxynaphthoates or the glycine salts, but it will be understood that many other salts may equally be used, it being understood that for use in the treatment of human malaria it is not desirable to use the salt of an acid which, of itself, possesses toxic properties.

The following examples illustrate but do not limit the invention. The parts are by weight.

*Example 1*

7.41 parts of $\omega$-ethyl-$\omega'$-p-chlorophenyldicyandiamide, 4.7 parts of isopropylamine hydrochloride and 50 parts of nitrobenzene are stirred together at 130°–140° C. for 16 hours. The reaction mixture is extracted with 200 parts of 7% hydrochloric acid and the acid solution is evaporated to dryness in a vacuum. The residue is dissolved in water, the solution is clarified with charcoal, filtered and made faintly alkaline with dilute ammonia. Salt is then added to precipitate $N^1$-p-chlorophenyl-$N^2$-ethyl-$N^5$-isopropylbiguanide monohydrochloride. It is purified by crystallisation from a mixture of ethanol and ethyl acetate and then melts at 174–176° C.

*Example 2*

6.95 parts of $\omega$-methyl-$\omega'$-p-chlorophenyldicyandiamide, 4.7 parts of ethylamine hydrochloride and 50 parts of nitrobenzene are stirred together at 130–140° C. for 16 hours. The reaction mixture is extracted with 200 parts of 7% hydrochloric acid and the acid extract is evaporated to dryness in a vacuum. The residue is dissolved in water and the solution is clarified by heating with charcoal and filtered. The filtrate is made just alkaline with very dilute ammonia, and salt is then added. $N^1$-p-chlorophenyl-$N^2$-methyl-$N^5$-ethyl-biguanide monohydrochloride is precipitated. It is recrystallised from a mixture of ethanol and ethyl acetate and then has M. P. 175°–177° C.

*Example 3*

7.41 parts of $\omega$-ethyl-$\omega'$-p-chlorophenyldicyandiamide, 4.1 parts of ethylamine hydrochloride and 50 parts of nitrobenzene are stirred together at 130°–140° C. for 16 hours. The reaction mixture is extracted with 200 parts of 7% hydrochloric acid, the aqueous layer is separated off and evaporated to dryness in a vacuum. The residue is dissolved in water, the solution is clarified with charcoal and filtered, and dilute ammonia is added until the solution is just faintly alkaline. Salt is then added whereupon $N^1$-p-chlorophenyl-$N^2$:$N^5$-diethylbiguanide hydrochloride is precipitated. After recrystallisation from a mixture of ethanol and ethyl acetate it has M. P. 175–177° C.

Example 4

7 parts of ω-methyl-ω'-p-iodophenyldicyandiamide, 3.3 parts of isopropylamine hydrochloride and 50 parts of nitrobenzene are stirred together at 130–135° C. for 16 hours. The mixture is then cooled and extracted three times with 2N hydrochloric acid and the combined acid extracts are evaporated to dryness in vacuo. The residue is dissolved in water and the solution is neutralised with dilute ammonia. Sodium chloride is added and $N^1$-p-iodophenyl-$N^2$-methyl-$N^5$-isopropylbiguanide hydrochloride is filtered off and purified by crystallisation from a mixture of ethanol and ethyl acetate. It has M. P. 212–214° C.

Example 5

By working as in Example 4 but using an equivalent amount of ω-ethyl-ω'-p-iodophenyldicyandiamide in place of the ω-methyl-ω'-p-iodophenyldicyandiamide there is obtained $N^1$-p-iodophenyl-$N^2$-ethyl-$N^5$-isopropylbiguanide hydrochloride of M. P. 219–220° C.

Example 6

3.05 parts of ω-methyl-ω'-p-bromophenyldicyandiamide, 1.9 parts of isopropylamine hydrochloride and 25 parts of nitrobenzene are stirred together at 130–135° C. for 16 hours. The mixture is then cooled and extracted with 2N hydrochloric acid. The extract is evaporated in vacuo and the residue is dissolved in water and made just alkaline by addition of dilute aqueous ammonia. Sodium chloride is then added and $N^1$ - p - bromophenyl - $N^2$ - methyl - $N^5$ - isopropylbiguanide hydrochloride is precipitated, filtered off and crystallised from a mixture of alcohol and ethyl acetate. It has M. P. 182–184° C.

Example 7

6.95 parts of ω-methyl-ω'-p-chlorophenyldicyandiamide, 4.7 parts of n-propylamine hydrochloride and 50 parts of nitrobenzene are heated together at 130–135° C. for 16 hours. The mixture is then extracted with 2N hydrochloric acid and the acid extract is evaporated to dryness in vacuo. The residue is dissolved in water and the aqueous solution is made alkaline by the addition of dilute ammonia. Sodium chloride is then added and $N^1$-p-chlorophenyl-$N^2$-methyl-$N^5$-n-propylbiguanide hydrochloride separates and is crystallised from a mixture of alcohol and ethyl acetate. It has M. P. 177–179° C.

Example 8

By working as in Example 7 but using ω-ethyl-ω'-p-chlorophenyldicyandiamide in place of ω-methyl - ω' - chlorophenyldicyandiamide, $N^1$ - p - chlorophenyl - $N^2$ - ethyl - $N^5$-n-propylbiguanide hydrochloride, M. P. 175°–177° C., is obtained.

Example 9

By working as in Example 7 but using n-butylamine hydrochloride in place of n-propylamine hydrochloride there is obtained $N^1$-p-chlorophenyl-$N^2$-methyl-$N^5$ -n-butylbiguanide hydrochloride, M. P. 160° C.

Example 10

By working as in Example 8 but using n-butylamine hydrochloride in place of n-propylamine hydrochloride there is obtained $N^1$-p-chlorophenyl-$N^2$-ethyl - $N^5$ - n - butylbiguanide hydrochloride, M. P. 177° C.

Example 11

6.95 parts of ω-methyl-ω'-p-chlorophenyl-dicyandiamide, 5.5 parts of methylisopropylamine hydrochloride and 50 parts of nitrobenzene are heated together at 130–135° C. for 16 hours. The nitrobenzene solution is then extracted with 2N hydrochloric acid and the acid solution is basified with sodium hydroxide. The base is extracted with ether, the ethereal extract is dried over sodium sulphate, the ether is evaporated and the residue is dissolved in acetone. The acetone solution is made acid to litmus by addition of acetic acid and $N^1$-p-chlorophenyl-$N^2$-methyl-$N^5$-methyl-$N^5$-isopropylbiguanide acetate is precipitated. It is purified by crystallisation from acetone and has then M. P. 192–194° C.

Example 12

By working as in Example 11 but using ω-ethyl-ω'-p-chlorophenyldicyandiamide in place of ω-methyl-ω'-p-chlorophenyldicyandiamide, $N^1$ - p - chlorophenyl-$N^2$-ethyl-$N^5$-methyl - $N^5$-isopropylbiguanide acetate, M. P. 184° C., is obtained.

Example 13

6.95 parts of ω-methyl-ω'-p-chlorophenyldicyandiamide, 5.5 parts of diethylamine hydrochloride and 50 parts of nitrobenzene are heated together at 130°–135° C. for 16 hours. The solution is then extracted with 2N hydrochloric acid and the acid extract is made alkaline with sodium hydroxide solution. The base thus liberated is extracted with ether. The ethereal extract is dried, the ether is evaporated and the residue is dissolved in acetone. The acetone solution is made acid to litmus with acetic acid, the solution is evaporated and the residue is triturated with 5 parts of acetone and 75 parts of ether. $N^1$-p-chlorophenyl-$N^2$-methyl-$N^5$:$N^5$-diethyl biguanide acetate is obtained and crystallised from acetone. It has M. P. 165–167° C.

Example 14

By proceeding as in Example 13 but using ω-ethyl-ω'-p-chlorophenyl-dicyandiamide, $N^1$ - p - chlorophenyl-$N^2$-ethyl - $N^5$:$N^5$ - diethylbiguanide acetate, M. P. 173–174° C., is obtained.

Example 15

By working as in Example 13 but using in place of diethylamine hydrochloride, dimethylamine hydrochloride, there is obtained $N^1$-p-chlorophenyl-$N^2$-methyl-$N^5$:$N^5$-dimethylbiguanide acetate which crystallises from a mixture of alcohol and acetone and has M. P. 172° C.

Example 16

By working as in Example 15 but using ω-ethyl-ω'-chlorophenyldicyandiamide in place of ω-methyl-ω'-p-chlorophenyldicyandiamide there is obtained $N^1$-p-chlorophenyl-$N^2$-ethyl-$N^5$:$N^5$-dimethylbiguanide acetate, M. P. 185° C.

While it will be understood that medical utility in the treatment of human malaria may be formally asserted only after extensive clinical trials, it has been found that in this class of compounds the efficacy of a substance in avian malaria, particularly in *Plasmodium gallinaceum* infection of chicks, is a good indication of its utility in the treatment of human malaria. Moreover, efficacy against the exo-erythrocytic forms of avian malaria organisms in this class of compounds is generally indicative of utility as a causal prophylactic in human malaria. Utility as a causal prophylactic is a very desirable feature of an antimalarial agent and this feature is not possessed by quinine. Quinine is merely curative and, to a degree, clinically prophylactic, these properties being generally indicated by efficacy against the erythrocytic forms in avian malaria. Thus, the compounds of the present invention possess generally a very important advantage in comparison with quinine. Yet a further advantage of the compounds of the present invention is that in general we have found that they are effective at a dosage which is much smaller in relation to the toxic dose than is the case with many pre-existing antimalarial agents.

Moreover, as indicated above, the compounds of the present invention are readily made by a relatively simple chemical process, and from cheap, or potentially cheap, starting materials. In this they show a clear advantage over many already-known synthetic antimalarial agents, notably over Mepacrine which is 2-chloro-5(ω-diethylamino-α-methylbutylamino) - 7 - methoxyacridine. Also being colourless they do not possess undesirable property of staining the skin of the patient.

We claim:

1. $N^1$-p-chlorophenyl-$N^2$-(lower alkyl) - $N^5$ - (lower alkyl)-biguanides.

2. $N^1$-p-chlorophenyl-$N^2$-ethyl - $N^5$ - isopropyl biguanide.

3. A compound selected from the group consisting of the free base form and salts of the biguanides of the general formula:

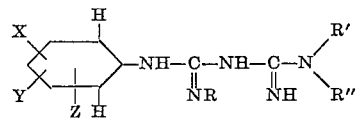

wherein R is a 1 to 3 carbon atom alkyl radical; R' is a lower alkyl radical; R" is a radical from the group consisting of hydrogen and lower alkyl, with the sum of the carbon atoms of radicals R' plus R" being between 1 and 8 inclusive; X and Y are radicals from the group consisting of hydrogen, halogen and 1 to 3 carbon atom alkyl, and Z is a radical of a halogen atom of atomic weight greater than fluorine.

4. A compound of the formula:

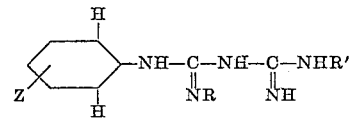

wherein R is a 1 to 3 carbon atom alkyl radical; R' is a lower alkyl radical, and Z is a radical of a halogen atom of atomic weight greater than fluorine.

5. A compound as claimed in claim 4, wherein the radical R' is isopropyl.

6. A compound as claimed in claim 5, wherein R is methyl.

7. A compound as claimed in claim 11, wherein the radical R' is isopropyl.

8. A compound as claimed in claim 7, wherein R is methyl.

9. $N'$-p-iodophenyl-$N^2$ - methyl - $N^5$ - isopropyl biguanide.

10. A compound of the formula:

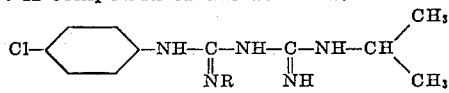

wherein R is a 1 to 3 carbon atom alkyl radical.

11. A compound of the formula:

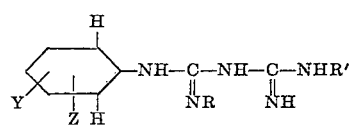

wherein Y and Z are radicals of a halogen atom of atomic weight greater than fluorine; R is a 1 to 3 carbon atom alkyl radical and R' is a lower alkyl radical.

12. A compound of the formula:

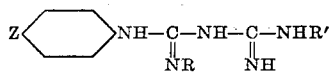

wherein Z is a radical of a halogen atom of atomic weight greater than fluorine, R is a 1 to 3 carbon atom alkyl radical and R' is a lower alkyl radical.

FRANCIS HENRY SWINDEN CURD.
DORA NELLIE RICHARDSON.
FRANCIS LESLIE ROSE.

REFERENCES CITED

The following references are of record in the file of this patent:

UNITED STATES PATENTS

| Number | Name | Date |
| --- | --- | --- |
| 1,777,737 | Scott et al. | Oct. 7, 1930 |
| 2,195,073 | Beretta | Mar. 26, 1940 |
| 2,289,541 | Ericks et al. | July 14, 1942 |

FOREIGN PATENTS

| Number | Country | Date |
| --- | --- | --- |
| 577,843 | Great Britain | June 13, 1946 |

OTHER REFERENCES

Clotta et al., "Ber. deut. Chem.," vol. 62 (1929), pp. 1394–1400.

Curd et al., "Annals. Tropical Med. & Parasitol.," vol. 39, Dec. 31, 1945, p. 208.